United States Patent
Blide

(10) Patent No.: US 6,956,184 B2
(45) Date of Patent: Oct. 18, 2005

(54) WELDING TORCH WITH VARIABLE POWER TRIGGER

(76) Inventor: Daniel J. Blide, 124 Turtleback Rd., Califon, NJ (US) 07830

( * ) Notice: Subject to any disclaimer, the term of this patent is extended or adjusted under 35 U.S.C. 154(b) by 154 days.

(21) Appl. No.: 10/629,395

(22) Filed: Jul. 28, 2003

(65) Prior Publication Data

US 2005/0023263 A1 Feb. 3, 2005

(51) Int. Cl.[7] ................................................. B23K 9/10
(52) U.S. Cl. ...................................................... 219/132
(58) Field of Search ............................... 219/132, 136, 219/137.31, 75

(56) References Cited

U.S. PATENT DOCUMENTS

| | | |
|---|---|---|
| 3,968,341 A | 7/1976 | Manning |
| 4,051,344 A | 9/1977 | Robbins |
| 4,227,066 A | 10/1980 | Bulwidas, Jr. |
| 4,510,373 A | 4/1985 | Cox et al. |
| 4,948,942 A | 8/1990 | Hiibel |
| 4,954,690 A * | 9/1990 | Kensrue .............. 219/137.31 |
| 5,338,917 A | 8/1994 | Stuart et al. |
| 6,005,221 A | 12/1999 | Cusick, III |
| 6,051,808 A | 4/2000 | Kleppen |
| 6,137,079 A | 10/2000 | Vincent et al. |
| 6,399,913 B1 | 6/2002 | Sammons et al. |
| 6,423,937 B1 | 7/2002 | Karlsson |

FOREIGN PATENT DOCUMENTS

CA 592443 * 2/1960 ............ 219/137.31

* cited by examiner

Primary Examiner—Clifford C. Shaw
(74) Attorney, Agent, or Firm—Kenneth P. Glynn

(57) ABSTRACT

A welding torch includes a holdable torch gun having a first connection for hook up to a gas or water supply, and a second connection for hook up to a power supply. The gun has a discharge barrel with an outlet end, and a handle extending downwardly from the discharge barrel. The discharge barrel has a front facing in a same direction as the outlet end of the discharge barrel. The handle has a variable power trigger that is spring loaded and biased away from the handle. The trigger has an unsqueezed position with no current flow, a fully squeezed position with full current flow and a range of motion area between the unsqueezed position and the fully squeezed position with a range of current flow. The handle also has an amperage control mechanism located therein that is connected to the second connection.

20 Claims, 3 Drawing Sheets

WELDING TORCH WITH VARIABLE POWER TRIGGER

BACKGROUND OF THE INVENTION

1. Field of the Invention

The present invention relates to welding torches that have improved, ergonomic, handle based, amperage control mechanisms. These mechanisms are convenient, ergonomic and efficient due to their trigger operated arrangements.

2. Information Disclosure Statement

The following patents relate to welding torches:

U.S. Pat. No. 3,968,341 describes a welding torch handle including electrical control means thus enabling a welder, by the control on the handle, to vary the welding current supplied to an electrode in the torch head fitted to the handle. The handle is characterized by employing a linearly actuated control that can continuously vary current applied to the electrode from 0 amps to the full setting on the welding power supply. This control eliminates foot, hand held, or motor driven controls and provides convenient single-handed current control by the welder.

U.S. Pat. No. 4,051,344 describes a control unit that comprises an elongated body having a forward torch mounting portion. Rearwards of the torch the body houses a linear potentiometer which includes an upstanding control arm for its movable compact. An off-on switch is located within said body, in a position to be contacted and operated by the control arm. A thumb button controlled sliding control member is attached to the control arm. In, use, the user grips the mid portion of the body and places his thumb on the thumb button. He uses a simple linear movement of his thumb to control the linear potentiometer, for varying the welding current, and to operate the off-on switch, for turning the arc welding machine on and off.

U.S. Pat. No. 4,227,066 describes a hand-operated remote control unit that has a housing containing a rotary potentiometer whose shaft carries a pinion which is driven by a rack having a spring loaded push button attached thereto. An eccentric cam is mounted on the potentiometer shaft adjacent a microswitch in which the cam surface is in contact with the switch where the push button is in its unactuated position. When the push button is actuated, the cam rotates releasing the switch, and the rack and pinion varies the resistance of the potentiometer to vary the welding current. A plurality of hat section holders for positioned on different surfaces of the housing for mounting an adjustable ring-shaped clamp having bayonet extensions thereon which fit into the hat section holders. The adjustable ring-shaped clamp which has a new screw therein is adapted to be adjustably mounted on the handle of the welding torch. The adjustable clamp may be moved up and down to a desired position on the welding torch and the welding torch may be rotated 360° therein. The plurality of hat section mounts into which the clamp fits permits further adjustment and placement of the welding torch to adapt in to reach difficult places and at the same time permit operation of the push button with various digits of the hands. Accordingly, finger tip control of the welding current is achieved without the necessity of moving the torch even while wearing bulky insulating gloves.

U.S. Pat. No. 4,510,373 describes a control unit for use with the welding gun of an arc welding assembly. A single adjustable means in the welding gun effects changes in the control unit to regulate welding voltage as well as the speed at which the electrode wire is fed to the welding site.

U.S. Pat. No. 4,948,942 describes a welding torch with a control means on the torch itself for adjusting welding current. This control means has a thumb button which can be actuated by the welder to turn the torch on or off and to adjust the current to an appropriate value for the weld being made. A latch means at one extreme of its travel is provided to hold the thumb button in the off position. This prevents the torch from being accidentally actuated by inadvertently moving the button.

U.S. Pat. No. 5,338,917 describes a present invention that includes several features which can be used alone or in combination. The three primary features are: 1) an ergonomically designed welding gun; 2) a quick disconnect cable assembly, and 3) an improved contact tip and diffuser. The ergonomic design for the welding gun includes one or more of the following features: a) the conductor tube can be rotated 360° about the centerline of the handle by the welder without resort to tools or disassembly of the gun; b) the conductor tube can be articulated 15° up or down, side to side, with out resort to tools or disassembly of the gun; c) the rear portion of the handle includes a gentle curve of approximately 10° off the centerline to facility gripping by the operator; d) the handle operator to actuate the gun while gripping same either at the rear portion of the handle of the front portion of the handle.

U.S. Pat. No. 6,005,221 describes an improved tungsten insert gas welder, having a means to remove heat energy using pressurized air, and a method for removing the heat away from the welder head area. A source of pressurized air is delivered through a hose to the welder head, and is directed through heat conductive air tubes within the welder head. It is then forced through a plurality of coils which surround an area that contains heat energy created during the welding process. As the air moves through the coils, it acquires some of the heat energy within the welder head. The heated air is vented into an outer jacket, which contains the electrically conductive cables, and an airspace surrounding the cables. As the heated air moves toward a rear connector block, it contacts the length of the cables, and is able to transfer some of the heat to the cables. This allows some of the heat energy contained within the pressurized air to be transferred through physical contact to the metal cable, so that as the air moves farther along the length of the metal cable. It will then loose more of its heat energy, so that it begins to cool, which will cause the heat acquired by the metal cable to move along the length of the cable in the direction of the cooler air toward the rear connector block, thus maximizing the cooling potential of this forced air system.

U.S. Pat. No. 6,051,808 describes a welding parameter control device for a welding torch operable by the welders thumb and/or index finger. A forward-located rotary knob or belt is positioned where the torch is of relatively small diameter and comfortable for the welder to hold in the hand. This is coupled to a rotary potentiometer located toward the rear portion of the torch. Here the torch diameter can be increased without discomfort to the welder. By placing the potentiometer in this position it can be much larger and more rugged than would be possible if located at the position of the control knob. In contrast to the use of a highly miniaturized potentiometer at the control point location, failure rate is greatly reduced. Weld disturbance due to torch movement during current adjustment is virtually eliminated by use of the fingertip operated rotary control.

U.S. Pat. No. 6,137,079 describes an invention relating to an electric arc welding torch body having an electrode holder and a nozzle, said nozzle being formed with at least one supplemental partition having an internal surface and an external surface, characterized in that at least one supplemental partition extends along at least one portion of the internal surface and/or external surface of the nozzle partition, in that one of said partitions is electrically conductive and in that the other of said partitions is electrically insulating and the use of such a torch in an electric arc welding or cutting process under a protective gas, particularly a TIG, MIG or MAG welding process.

U.S. Pat. No. 6,399,913 describes an insulative grip for a TIG torch that is held in a person's fingers like a pen or pencil. The grip has an external contour that has multiple gripping areas. The size and shape of the gripping areas conform to the person's thumb and first two fingers when he holds the grip. The gripping areas reduce the tendency for the torch to move in the person's hand. The gripping areas also provide and indication of the orientation in space of the torch electrode when the person holds the torch. The torch may be either water-cooled or air-cooled.

U.S. Pat. No. 6,423,937 describes an invention relating to an arrangement for contact arc ignition in manual TIG welding and to a method for welding with this arrangement. The arc is established by lifting the welding torch after contact between electrode and workpiece under low ignition current. When the arc length is sufficient, the welder orders a change-over to welding current via an operating device. The invention can also be used for controlling the supply of heat to the workpiece both during continuous bead application and during the crater filling time at the end of welding. The invention creates reliable ignitions without extensive use of control electronics, and it substantially reduces the electrode wear in manual TIG welding.

Notwithstanding the prior art, the present invention is neither taught nor rendered obvious thereby.

SUMMARY OF THE INVENTION

The present invention is a welding torch with a variable power trigger. Torches for welding typically have remotely located controls for power level or amperage control. These controls are located away from the torch itself, such as located on the power supply console, or on a foot pedal. Some torches have amperage controls on the torch component itself, as indicated by the prior art teachings cited above, however, these controls require two hands, or complex motion, turning or twisting motion, and may result in unwanted movement of the torch itself, causing welding errors, weaknesses, faults or sloppiness. The present invention torches however, offer trigger control at the torch handle for regulating amperage (at fixed voltage, amperage regulation is also power regulation).

The present invention welding torch includes a holdable torch gun having a first connection for hook up to a gas or water supply, and a second connection for hook up to a power supply. The gun has a discharge barrel with an outlet end, and a handle extending downwardly from the discharge barrel. The discharge barrel has a front facing in a same direction as the outlet end of the discharge barrel. The handle has a variable power trigger located thereon such that the trigger is spring loaded away from the handle and may be moved by pressure toward the handle, the trigger having an unsqueezed position and a fully squeezed position and a range of motion area between the unsqueezed position and the fully, squeezed position. The handle also has an amperage control mechanism located therein and connected to the second connection. The trigger is moveably connected to the amperage control mechanism such that the unsqueezed position prevents any current to flow to the discharge barrel, the fully squeezed position permits maximum current to flow to the discharge barrel and any squeezed portion therebetween permits a proportionate amount of current to flow to the discharge barrel in proportion to distance between the unsqueezed position and the fully squeezed position.

In some embodiments of the present invention, the welding torch amperage control mechanism is a linear potentiometer. In other embodiments, the amperage control mechanism is a geared rotary potentiometer and the trigger includes a rack gear functionally connected to the geared rotary potentiometer.

The present invention welding torch may be a type of electrically powered torch wherein power is at least partially determinative of function. For example it may be a TIG torch, a MIG torch, or otherwise. Further, it may be a water cooled, or a gas cooled torch. In most embodiments, the welding torch handle extends downwardly from the discharge barrel at angle of about 60° to about 125° therefrom. Also, in most preferred embodiments, the welding torch trigger is located at the front of a the handle.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
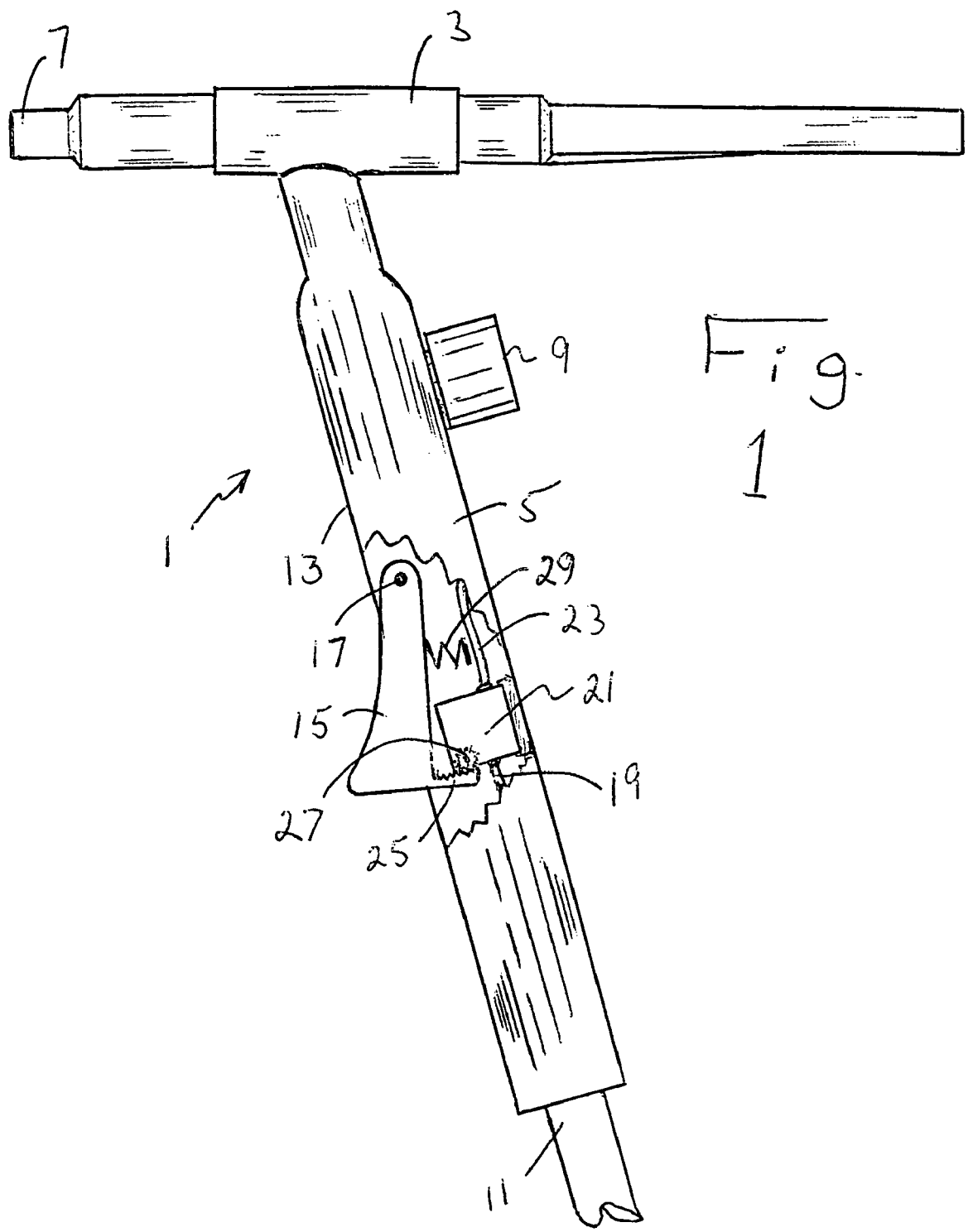
FIG. 1 shows a side, partially cut view of one embodiment of the present invention torch.

Referring now in detail to the drawings, FIG. 1 shows a side, partially cut view of present invention torch 1. Welder torch 1 includes a handle 5 with a discharge barrel 3 connected thereto at an obtuse angle of about 110°. The discharge barrel 3 has a front end which is an outlet end 7. There is an inert gas control knob 9 located on handle 5, and an inlet tube 11 entering the bottom of handle 5. Inlet tube 11 may contain separate inlet lines for electrical power and inert gas or water lines for liquid cooled torch. These arrangements are well known to the artisan and the details are a matter of choice. In normal torches, the power line would run through the handle 5 and to the discharge barrel outlet end 7. In the present invention torch, lower end 19 of the power line and upper end 23 of the power line are separated by a rotary potentiometer in housing 21. Trigger 15 controls the power passing through the potentiometer in housing 21. Trigger 15 is hingedly connected to handle 5 by a pivot member 17 (screw, rod, axle, rivet or equivalent). It is biased outwardly by spring 29. A rack and pinion arrangement is established between trigger 15 and the rotary potentiometer. Specifically, trigger 15 has straight gear 25 and the rotary potentiometer has round gear 27. They interact such that when trigger 15 is at its rest (open) position no current flows through power line upper end 23. As trigger 15 is squeezed and straight gear 25 rotates round gear 27, the current through power line upper end 23 increases proportionately (for example, linearly or quadratically). When trigger 15 is squeezed or depressed fully, the current through power line upper end 23 will be maximum.

In other embodiments, the trigger could move straight in or the entire arrangement could be reversed, i.e., could be upside down from the way it is shown in FIG. 1. Further, the internal control between the trigger and the current could be any technically functional arrangement. For example, a linear potentiometer running in a direction of bottom to top could be utilized with a flexible controller attached to the trigger that would flex and move outwardly as the trigger moved inwardly. In yet another embodiment, a linear potentiometer operating at right angles to the length of the handle could be used as shown in FIG. 2 below.

Figure 2:
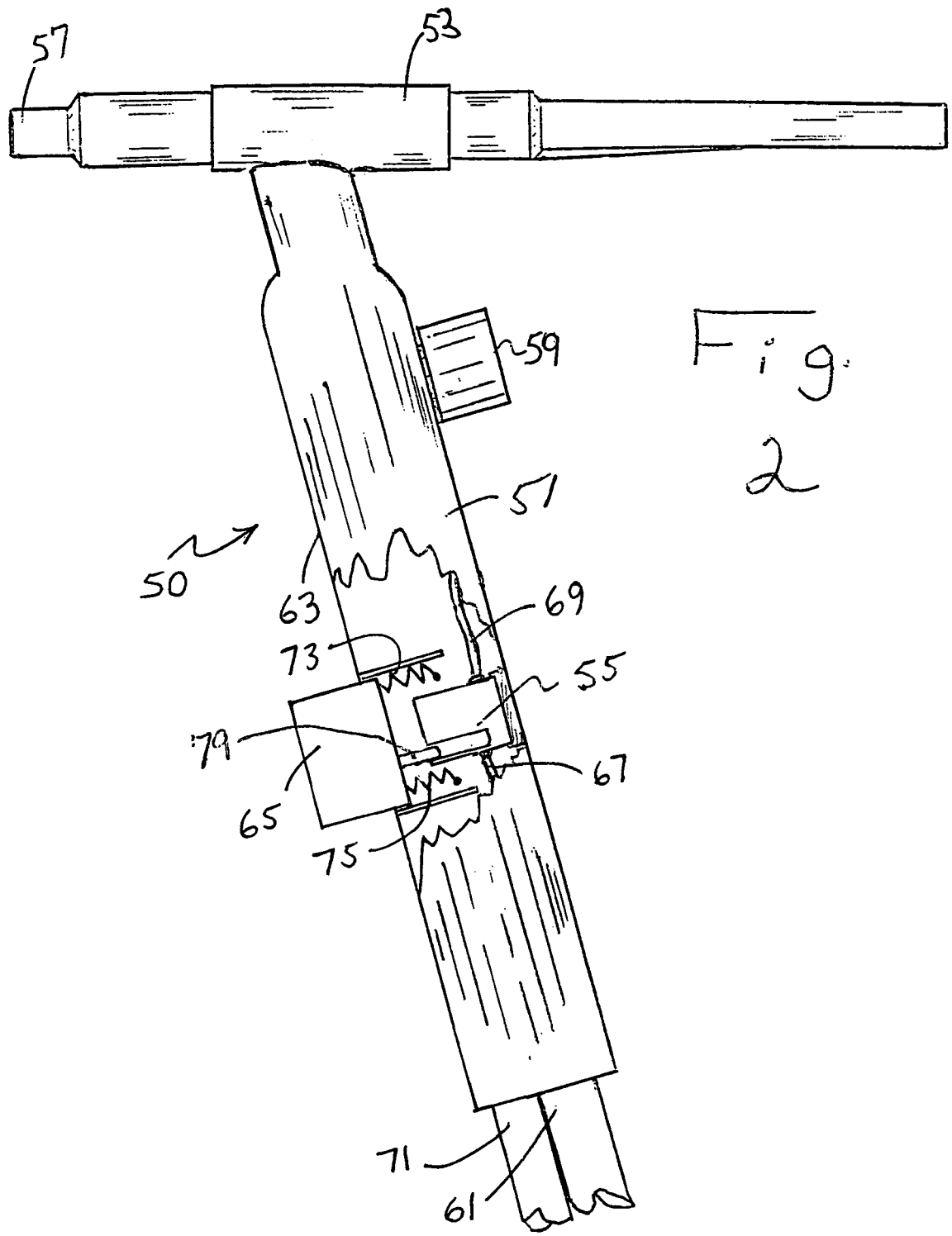
FIG. 2 shows a side, partially cut view of another embodiment of the present invention torch.

FIG. 2 shows a side, partially cut view of another embodiment of the present invention torch 50. Torch 50 includes handle 51 with a discharge barrel 53 connected to it at an angle of about 110°. The discharge barrel 53 has outlet end 57 at its front. There is an inert gas control knob 59 located on handle 51, and an inlet tube 61 for gas entry and discharge, and electrical cable 71, entering the bottom of handle 51.

In the present invention torch 50, lower end 67 of the power line and upper end 69 of the power line are separated by a linear potentiometer in housing 55. Trigger 65 controls the power passing through the potentiometer in housing 55. Trigger 65 is moveably connected to handle 51 by springs 73 and 75 which bias it outwardly. A slide arrangement is established between trigger 65 and the potentiometer. Specifically, trigger 65 has a slide 79 that cooperates to run the potentiometer, as shown. They interact such that when trigger 65 is at its rest (open) position, no current flows through power line upper end 69. As trigger 65 is squeezed and the slide 79 moves and the current through power line upper end 69 increases proportionately (for example, linearly or quadratically). When trigger 65 is squeezed or depressed fully, the current through power line upper end 69 will be maximum.

Figure 3:
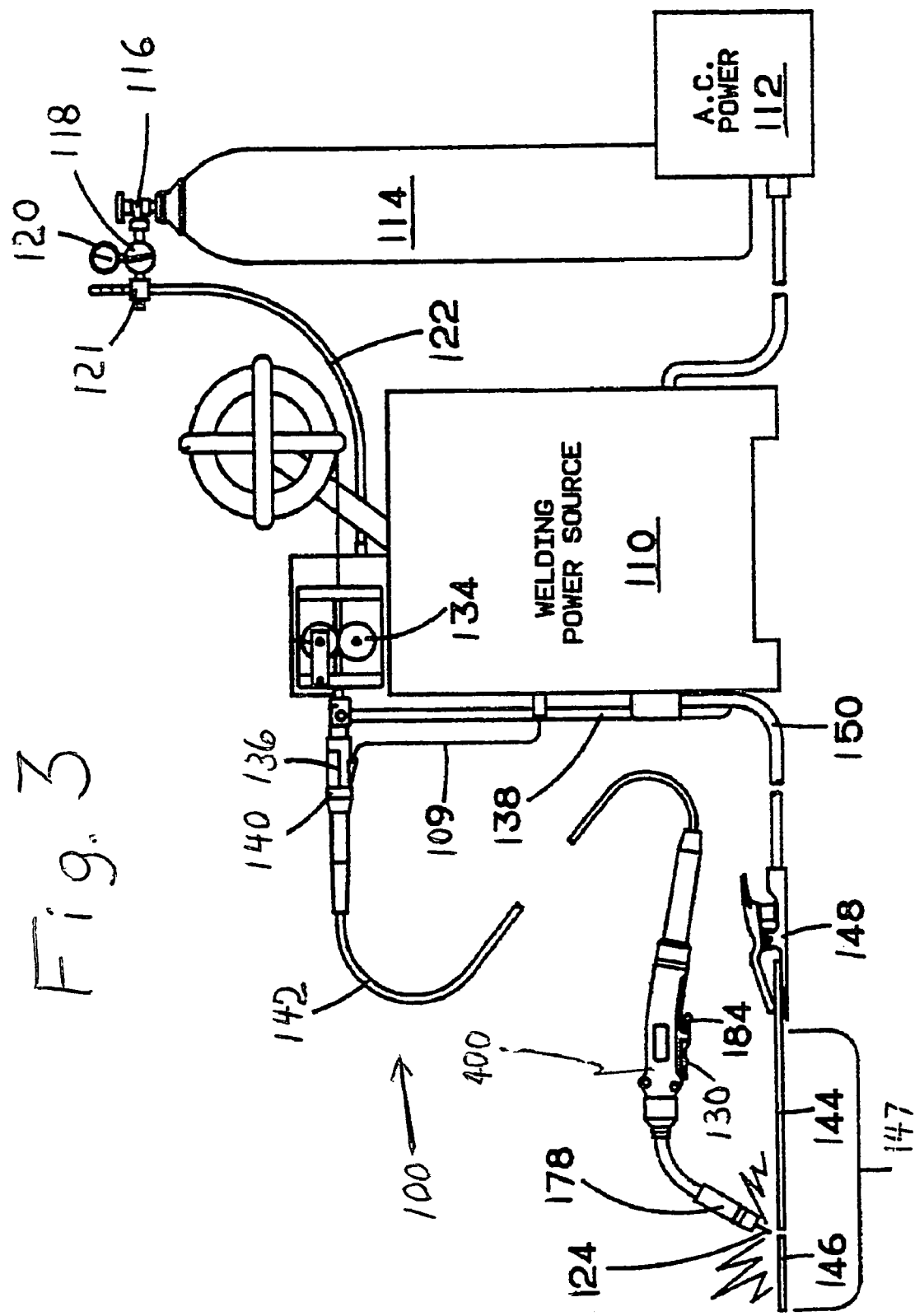
FIG. 3 shows a stylized view of a present invention torch system.

FIG. 3 shows a stylized view of a present invention torch system. In FIG. 3, the present invention welding gun system is generally identified by the numeral 100. The primary components of a MIG welding system which are well known to those skilled in the art, are shown in this figure. The welding power source 110 connects to an AC power supply 112 which is shown diagrammatically.

Also connected to the welding power source 110 is a high pressure gas cylinder 114 which typically contains an inert gas such as argon or perhaps a combination of argon and carbon dioxide. A shut-off valve 116 is attached to the high pressure cylinder 114. A regulator 118 is connected via piping to the valve 116 and typically reduces the pressure of the inert gas downstream from the regulator 118 to approximately 30 psi. A pressure gauge 120 provides a visual display of the gas pressure in cylinder 114. A high pressure hose 122 provides fluid communication for the inert gas to the welding power source 110. The flow meter 121 is in fluid communication with the regulator 118 and the high pressure hose 122. In a typical MIG system, the inert gas flows at approximately 20 to 60 cubic feet per hour (560–1700 liters per hour).

The welding wire assembly 134 operated in any standard, well known manner. Welding wire 124 is controllably advanced from welding wire assembly 134. An electrical cable 138 runs from the welding power source 110 to the adapter 136. A rear connector 140 engages the adapter 136. In some situations, an adapter 136 is not required and the rear connector plugs directly in to the welding wire assembly 134 and receives electrical power therefrom.

Control wires are releasably connected on one end to the rear connector 140 and on the other end to the welding power source 110 or to the wire feeder assembly. The trigger 184 on the welding gun 400 actuates the welding power source 110 by closing the control circuit. Control wires run from the trigger 184 along the welding cable 142 to the control wire 109 which connect to the welding power source 110. The trigger 184 is a variable control trigger and operates like the trigger of FIG. 1 above. Separate on/off switch 130 is also included.

The coaxial welding cable 142 connects on one end to the rear connector 140 and on the other end to the welding gun 400. In this example, the workpiece 147 consists of a first plate 144 and a second plate 146 which are being welded together. A ground clamp 148 is attached to the workpiece 147 to complete the electrical circuit. A cable 150 electrically connects the welding power source 110 with the ground clamp 148.

In a typical MIG system, the workpiece is negative and the welding wire 124 is positive. The electrical circuit for a typical MIG welding system is completed as follows: The welding power source 110 connects to a cable 150 at the end of which is a ground clamp 148. The ground clamp 148 is manually attached by the welder to the workpiece 147. An electrical arc is created between the workpiece 147 and the welding wire 124 which causes the welding wire to melt into a molten pool thus joining the plates 144 and 146. The electrical current is transferred to the welding wire 124 through the contact tip not shown in this figure, but discussed in greater detail hereinafter. The electrical current is transferred to the MIG welding gun 400, through copper stranding in the coaxial welding cable 142 to the rear connector 140. The rear connector 140 engages the adapter 136 which is connected via the cable 138 to the welding power source to complete the electrical circuit.

The welding power source 110 will typically provide DC current to the adapter 136 which is eventually transferred to the welding gun 400. Prior to beginning a project, the operator will typically adjust voltage as determined by the workpiece and the size of the welding wire. The operator will also adjust the amperage based on the rate of welding wire fed and the size of the workpiece. The voltage controls and the amperage controls for the welding power source 110 are set up to allow the user to set the voltage, to set a maximum amperage, and to then use trigger 184 to closely control the amperage, and have power to the workpiece.

The above examples describe amperage control in-line with the main power to the torch. Alternatively, and in many cases, the potentiometer would be wired to a controller (e.g. at the main control) and control that controller to regulate amperage.

Obviously, numerous modifications and variations of the present invention are possible in light of the above teachings. For example, it is not essential that a potentiometer b utilized to control current. An integrated circuit or other electronic or electrical device that performs amperage control, could be used without exceeding the scope of the present invention. Also, while a mechanical trigger is shown, a digital trigger could be utilized in its place. Alternatively, the trigger could be a step-notched trigger so that there would be incremental resistance points along its path to help the user "feel" movement and position. Further, an LCD presentation could show actual amperage. Further, while the device is directly in line with the wiring, it could control amperage at the main control unit by airwave transmittal, e.g., radio waves. Also, while D.C. current systems are described, there are systems that could use A.C. current. It is therefore understood that within the scope of the appended claims, the invention may be practiced otherwise than as specifically described herein.

What is claimed is:

1. A welding torch with a variable power trigger, which comprises:
   a holdable torch gun having a first connection for hook up to a gas or water supply, and a second connection for hook up to a power supply, said gun having a discharge barrel with an outlet end, and a handle extending downwardly from said discharge barrel, said discharge barrel having a front facing in a same direction as said outlet end of said discharge barrel, and said handle having a variable power trigger located thereon such that said trigger is hingedly connected to said handle with a pivot member and said trigger is spring loaded to be biased away from said handle and may be moved by pressure toward said handle, said trigger having an unsqueezed position and a fully squeezed position and a range of motion area between said unsqueezed position and said fully squeezed position, and said handle having an amperage control mechanism located therein and connected to said second connection;
   wherein said trigger is moveably connected to said amperage control mechanism such that said unsqueezed position prevents any current to flow to said discharge barrel, said fully squeezed position permits maximum current to flow to said discharge barrel and any squeezed portion therebetween permits a proportionate amount of current to flow to said discharge barrel in proportion to distance between said unsqueezed position and said fully squeezed position.

2. The welding torch of claim 1 wherein said amperage control mechanism is a linear potentiometer.

3. The welding torch of claim 1 wherein said amperage control mechanism is a geared rotary potentiometer and said trigger includes a rack gear functionally connected to said geared rotary potentiometer.

4. The welding torch of claim 1 wherein said torch is a TIG torch.

5. The welding torch of claim 1 wherein said torch is a MIG torch.

6. The welding torch of claim 1 wherein said torch is water cooled.

7. The welding torch of claim 1 wherein said torch is gas cooled.

8. The welding torch of claim 1 wherein said handle extends downwardly from said discharge barrel at angle of about 60° to about 125° therefrom.

9. The welding torch of claim 1 wherein said trigger is located at said front of a said handle.

10. A welding torch system, including a torch with a variable power trigger, which comprises:
    (a.) a welding power supply for receiving AC current and converting to DC current and providing DC current to a torch gun;
    (b.) a holdable torch gun having a first connection for hook up to a gas or water supply, and a second connection for hook up to a power supply, said gun having a discharge barrel with an outlet end, and a handle extending downwardly from said discharge barrel, said discharge barrel having a front facing in a same direction as said outlet end of said discharge barrel, and said handle having a variable power trigger located thereon such that said trigger is hingedly connected to said handle with a pivot member and said trigger is spring loaded to be biased away from said handle and may be moved by pressure toward said handle, said trigger having an unsqueezed position and a fully squeezed position and a range of motion area between said unsqueezed position and said fully squeezed position, and said handle having an amperage control mechanism located therein and connected to said second connection;
    wherein said trigger is moveably connected to said amperage control mechanism such that said unsqueezed position prevents any current to flow to said discharge barrel, said fully squeezed position permits maximum current to flow to said discharge barrel and any squeezed portion therebetween permits a proportionate amount of current to flow to said discharge barrel in proportion to distance between said unsqueezed position and said fully squeezed position.

11. The welding torch system of claim 10 wherein said welding power supply includes controls for setting a maximum current level selected form a plurality of maximum current levels for current provided to said torch gun.

12. The welding torch system of claim 10 wherein said amperage control mechanism is a linear potentiometer.

13. The welding torch system of claim 10 wherein said amperage control mechanism is a geared rotary potentiometer and said trigger includes a rack gear functionally connected to said geared rotary potentiometer.

14. The welding torch system of claim 10 wherein said torch is a TIG torch.

15. The welding torch system of claim 10 wherein said torch is a MIG torch.

16. The welding torch system of claim 10 wherein said torch is water cooled.

17. The welding torch system of claim 10 wherein said torch is gas cooled.

18. The welding torch system of claim 10 wherein said handle extends downwardly from said discharge barrel at angle of about 60° to about 125° therefrom.

19. The welding torch system of claim 10 wherein said trigger is located at said front of a said handle.

20. The welding torch system of claim 19 wherein said welding power supply includes controls for setting a maximum current level selected form a plurality of maximum current levels for current provided to said torch gun.

* * * * *